(12) United States Patent
Shen et al.

(10) Patent No.: US 12,435,863 B2
(45) Date of Patent: Oct. 7, 2025

(54) REFLECTIVE ELEMENT AND BACKLIGHT MODULE

(71) Applicant: DARWIN PRECISIONS CORPORATION, Hsinchu County (TW)

(72) Inventors: Wen-Tai Shen, Hsinchu County (TW); Ming Chin Tsai, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 18/398,199

(22) Filed: Dec. 28, 2023

(65) Prior Publication Data
US 2024/0401774 A1     Dec. 5, 2024

(30) Foreign Application Priority Data
May 29, 2023   (TW) .................................. 112119870

(51) Int. Cl.
| F21V 7/00 | (2006.01) |
| F21V 7/04 | (2006.01) |
| G02F 1/1333 | (2006.01) |
| G02F 1/13357 | (2006.01) |
| H10H 20/856 | (2025.01) |

(Continued)

(52) U.S. Cl.
CPC ............ *F21V 7/0066* (2013.01); *F21V 7/041* (2013.01); *G02F 1/133314* (2021.01); *G02F 1/133603* (2013.01); *G02F 1/133605* (2013.01); *H10H 20/856* (2025.01); *F21Y 2101/00* (2013.01); *F21Y 2113/00* (2013.01)

(58) Field of Classification Search
CPC ................. F21V 7/0066; F21V 7/0041; G02F 1/133605; G02F 1/133603; G02F 1/133314; H01L 33/60
See application file for complete search history.

(56) References Cited

U.S. PATENT DOCUMENTS

| 10,359,559 B2 | 7/2019 | Chang et al. |
| 2013/0148035 A1* | 6/2013 | Shimizu ............ G02F 1/133605 |
| | | 348/739 |
| 2019/0094617 A1* | 3/2019 | Park .................. G02F 1/133615 |

FOREIGN PATENT DOCUMENTS

| CN | 201439909 U | * 4/2010 | |
| CN | 110609417 A | * 12/2019 | ....... G02F 1/133603 |

(Continued)

*Primary Examiner* — Fatima N Farokhrooz

(57) ABSTRACT

A reflective element includes multiple reflective cavities and multiple spacers. Each reflective cavity has an upper opening, a lower opening, and a peripheral surface. A peripheral-surface bottom edge of the peripheral surface is disposed on a substrate of a light board, and the lower opening of the reflective cavity corresponds to one light emitting component. Each spacer includes a bottom surface, a first inclined surface, and a second inclined surface. The bottom surface is connected to the first inclined surface and the second inclined surface, and the bottom surface is disposed on the substrate and flush with the peripheral-surface bottom edge. The first inclined surface and the second inclined surface respectively serve as the side surfaces of adjacent two of the reflective cavities, and some of the spacers have a height difference between a top edge of the first inclined surface and a top edge of the second inclined surface.

28 Claims, 7 Drawing Sheets

(51) Int. Cl.
*F21Y 101/00* (2016.01)
*F21Y 113/00* (2016.01)

(56) References Cited

FOREIGN PATENT DOCUMENTS

| | | | | |
|---|---|---|---|---|
| CN | 114442371 A | * | 5/2022 | ....... G02F 1/133605 |
| CN | 114578615 A | | 6/2022 | |
| JP | 2013246954 A | * | 12/2013 | |
| KR | 20090048383 A | * | 5/2009 | |
| TW | I776581 B | | 9/2022 | |

* cited by examiner

REFLECTIVE ELEMENT AND BACKLIGHT MODULE

FIELD OF THE INVENTION

The present invention relates to a backlight module technology, and in particular to, a reflective element and a backlight module using such reflective element.

BACKGROUND OF THE INVENTION

According to the position of the light source, backlight modules can be classified into edge-lit backlight modules and direct-lit backlight modules. In direct-lit backlight modules, the light sources on the light board are arranged in a matrix. A diffusion plate is placed on the light board, and a lightbox distance between the light board and the diffusion plate serves as a light mixing region. However, currently, in the case of turning on all light sources of the direct-lit backlight module, the center region of the screen is always brighter than the surrounding regions, resulting in less than 60% light rays being uniform on the screen, thereby affecting the usage efficiency of the backlight module.

SUMMARY OF THE INVENTION

The present invention provides a reflective element applicable to a backlight module. Reflective elements with uneven top edges are used to change the uneven brightness in the backlight module, making the light rays on the screen of the display panel more uniform.

The present invention provides a reflective element suitable for applying to a light board. The light board includes a substrate and multiple light emitting components disposed on the substrate, and the reflective element includes multiple reflective cavities and multiple spacers.

Each reflective cavity is provided with an upper opening, a lower opening, and a peripheral surface. A peripheral-surface bottom edge of the peripheral surface is connected to the substrate, the lower opening of the reflective cavity corresponds to one light emitting component, and the peripheral surface of each reflective cavity includes multiple side surfaces. Each spacer includes a bottom surface, a first inclined surface, and a second inclined surface, where the bottom surface is connected to the first inclined surface and the second inclined surface. The spacers are disposed on the substrate, the bottom surface of each spacer is flush with the peripheral-surface bottom edge of the peripheral surface of the reflective cavity. The first inclined surface and the second inclined surface respectively serve as the side surfaces of adjacent two of the reflective cavities, and some of the spacers have a height difference between the top edge of the first inclined surface and the top edge of the second inclined surface.

In an embodiment of the present invention, the peripheral surface of the foregoing reflective cavity has a peripheral-surface top edge, and a spatial plane formed by the peripheral-surface top edges of the reflective cavities is not parallel to the substrate.

In an embodiment of the present invention, the spacers are classified into multiple high spacers and multiple middle spacers. A first height difference is present between the top edge of the first inclined surface of the high spacer and the top edge of the first inclined surface of the middle spacer.

In an embodiment of the present invention, the reflective cavities are classified into multiple first reflective cavities and multiple second reflective cavities. Some of the first reflective cavities are adjacent to some of the second reflective cavities, the side surface of the first reflective cavity and the side surface of the second reflective cavity adjacent thereto are respectively formed by the first inclined surface and the second inclined surface of the high spacer, and the top edge of the first inclined surface of the high spacer is higher than the top edge of the second inclined surface of the high spacer.

In an embodiment of the present invention, the reflective cavities are classified into multiple first reflective cavities and multiple second reflective cavities. Some of the first reflective cavities are adjacent to some of the second reflective cavities, at least one side surface of the first reflective cavity and at least one side surface of the second reflective cavity adjacent thereto are respectively formed by the first inclined surface and the second inclined surface of the middle spacer, and the top edge of the first inclined surface of the middle spacer is flush with the top edge of the second inclined surface of the middle spacer.

In an embodiment of the present invention, distribution regions of the reflective cavities are classified into a central region and at least one peripheral region. The first reflective cavities are distributed adjacent to each other in the central region, and the second reflective cavities are distributed in the peripheral region.

In an embodiment of the present invention, the peripheral region is provided in plurality, and the plurality of peripheral regions are respectively distributed at at least four corners of outermost peripheries of the central region.

In an embodiment of the present invention, the spacers are classified into multiple high spacers, multiple middle spacers, and multiple lower spacers. A first height difference is present between the top edge of the first inclined surface of the high spacer and the top edge of the first inclined surface of the middle spacer, and a second height difference is present between the top edge of the first inclined surface of the middle spacer and the top edge of the first inclined surface of the lower spacer.

In an embodiment of the present invention, the reflective cavities are classified into multiple first reflective cavities, multiple second reflective cavities, and multiple third reflective cavities. Some of the second reflective cavities are adjacent to some of the third reflective cavities, side surfaces of the second reflective cavities and the side surfaces of the third reflective cavities adjacent thereto are respectively formed by the first inclined surfaces and the second inclined surfaces of some of the middle spacers, the second height difference is present between the top edge of the first inclined surface of the middle spacer and the top edge of the second inclined surface of the middle spacer, and the top edge of the first inclined surface of the middle spacer is higher than the top edge of the second inclined surface of the middle spacer.

In an embodiment of the present invention, the reflective cavities are classified into multiple first reflective cavities, multiple second reflective cavities, and multiple third reflective cavities. Some of the second reflective cavities are adjacent to some of the third reflective cavities, at least one side surface of the second reflective cavity and at least one side surface of the third reflective cavity adjacent thereto are respectively formed by the first inclined surface and the second inclined surface of some of the lower spacers, and the top edge of the first inclined surface of the lower spacer is flush with the top edge of the second inclined surface of the lower spacer.

In an embodiment of the present invention, distribution regions of the reflective cavities are classified into a central region, at least one transition region, and at least one peripheral region. The first reflective cavities are distributed adjacent to each other in the central region, and the second reflective cavities are distributed adjacent to each other in the transition region, and the third reflective cavities are distributed in the peripheral region.

In an embodiment of the present invention, the peripheral region is provided in plurality, and the plurality of peripheral regions are respectively distributed at at least four corners of outermost peripheries of the central region.

In an embodiment of the present invention, the first height difference is equal to the second height difference.

In an embodiment of the present invention, the first height difference is different from the second height difference, which includes, but is not limited to the following examples: The first height difference is greater than the second height difference, and the first height difference is an integer multiple of the second height difference, or the first height difference is smaller than the second height difference, and the second height difference is an integer multiple of the first height difference.

In an embodiment of the present invention, the reflective element further includes a frame disposed on the substrate and framing the reflective cavities.

The present invention provides a backlight module, including a light board, a reflective element, and an optical panel. The light board includes a substrate and multiple light emitting components disposed on the substrate. The reflective element includes multiple reflective cavities and multiple spacers. Each reflective cavity is provided with an upper opening, a lower opening, and a peripheral surface. A peripheral-surface bottom edge of the peripheral surface is connected to the substrate, the lower opening of the reflective cavity corresponds to one light emitting component, and the peripheral surface of each reflective cavity includes multiple side surfaces. The spacer includes a bottom surface, a first inclined surface, and a second inclined surface, where the bottom surface is connected to the first inclined surface and the second inclined surface. The spacers are disposed on the substrate, the bottom surface of each spacer is flush with the peripheral-surface bottom edge. The first inclined surface and the second inclined surface respectively serve as the side surfaces of adjacent two of the reflective cavities, and some of the spacers have a height difference between the top edge of the first inclined surface and the top edge of the second inclined surface. The optical panel is disposed on the reflective element, where the top edge of the first inclined surface or the top edge of the second inclined surface of the spacer closest to the optical panel is at a distance of 1 millimeter to 4 millimeters from the optical panel.

In an embodiment of the present invention, the optical panel is selected from a diffusion plate, a structural plate, or a combination thereof.

In an embodiment of the present invention, the structural plate includes a plate body and multiple microstructures, where the plate body has two opposite surfaces, and the microstructures are disposed on at least one of the two surfaces.

In an embodiment of the present invention, the microstructure is in a shape of a cross, a square pyramid, or a triangular pyramid.

In an embodiment of the present invention, the backlight module further includes an optical film assembly disposed on a side of the optical panel away from the reflective element.

In an embodiment of the present invention, the optical film assembly includes one of a beam-splitting film, a brightness-enhancing film, or a combination thereof.

In an embodiment of the present invention, the optical film assembly further includes a light conversion film and a blue light-filtering film.

In the present invention, the multiple spacers are used to separate multiple reflective cavities, and the first inclined surface and the second inclined surface of the spacer respectively serve as the side surfaces of two adjacent reflective cavities. Some of the spacers have a height difference between the top edge of the first inclined surface and the top edge of the second inclined surface, and therefore the light emitting components (for example, the light emitting diode) in the reflective cavity reflect different light rays, so as to achieve consistent brightness in the central region, the transition region, and peripheral region of the reflective element, thus improving the uniformity of the light rays on the screen of the display panel.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
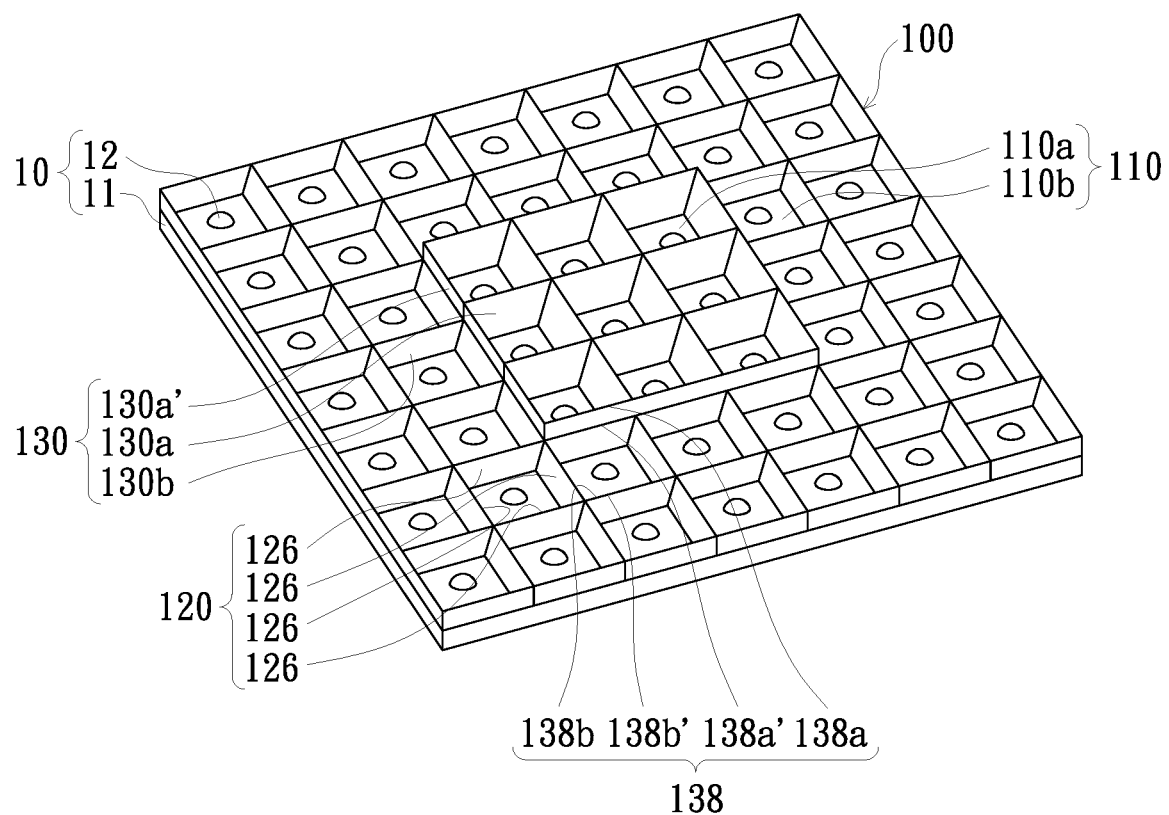
FIG. 1 is a schematic three-dimensional diagram of a reflective element disposed on a light board according to a first embodiment of the present invention.
Figure 2:
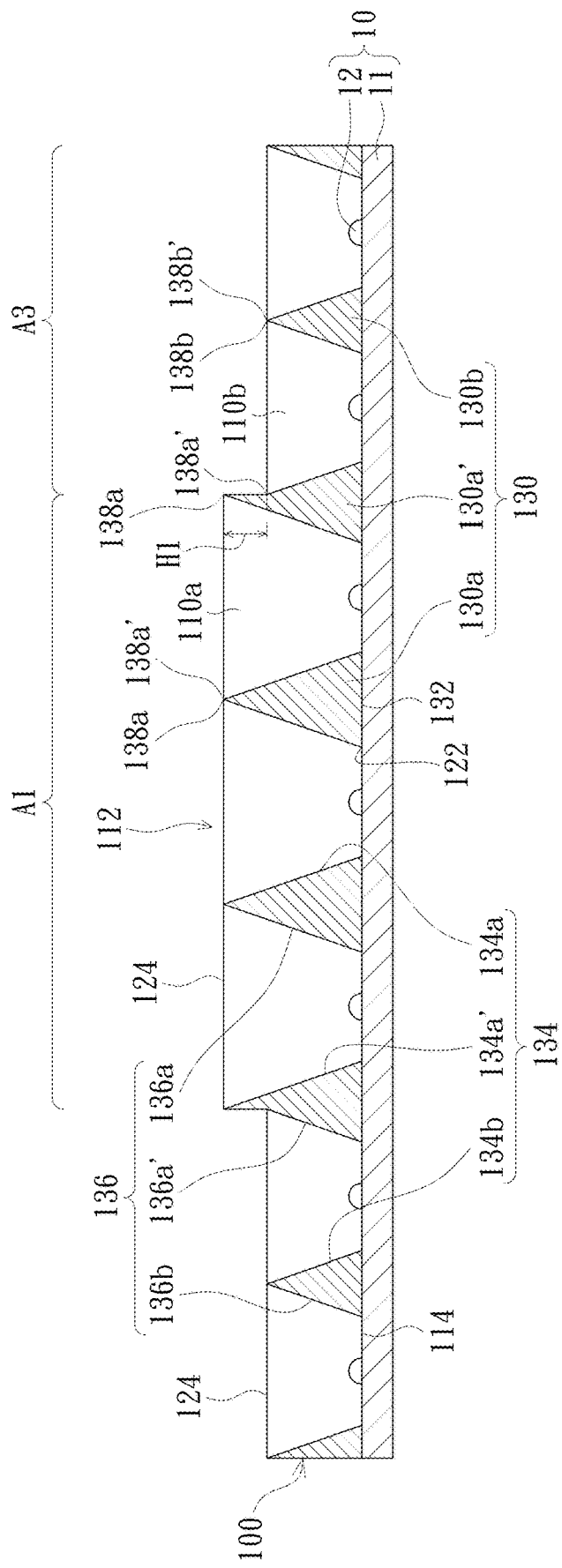
FIG. 2 is a schematic cross-section view of the reflective element disposed on the light board according to the first embodiment of the present invention.

FIG. 1 is a schematic three-dimensional diagram of a reflective element disposed on a light board according to a first embodiment of the present invention. FIG. 2 is a schematic cross-section view of the reflective element disposed on the light board according to the first embodiment of the present invention. As shown in FIGS. 1 and 2, the reflective element 100 is disposed on the light board 10, and the light board 10 includes a substrate 11 and multiple light emitting components 12. The reflective element 100 includes multiple reflective cavities 110 and multiple spacers 130. The reflective cavity 110 is provided with an upper opening 112, a lower opening 114, and a peripheral surface 120. A peripheral-surface bottom edge 122 of the peripheral surface 120 is connected to the substrate 11, the lower opening 114 of the reflective cavity 110 corresponds to one light emitting component 12, and the peripheral surface 120 of the reflective cavity 110 includes multiple side surfaces 126. Each spacer 130 includes a bottom surface 132, a first inclined surface 134, and a second inclined surface 136, where the bottom surface 132 is connected to the first inclined surface 134 and the second inclined surface 136. The spacers 130 are disposed on the substrate 11, the bottom surface 132 of each spacer 130 is flush with the peripheral-surface bottom edge 122 of the peripheral surface 120 of the reflective cavity 110. The first inclined surface 134 and the second inclined surface 136 respectively serve as the side surfaces 126 of adjacent two of the reflective cavities 110, and some of the spacers 130 have a height difference between the top edge 138 of the first inclined surface 134 and the top edge 138' of the second inclined surface 136.

Referring to FIG. 2, in an embodiment, the spacers 130 may be, for example, classified into multiple high spacers 130a, 130a' and multiple middle spacers 130b. A first height difference H1 is present between the top edges 138a of the first inclined surfaces 134a, 134a' of the high spacers 130a, 130a' and the top edge 138b of the first inclined surface 134b of the middle spacer 130b.

According to the foregoing description, as shown in FIG. 2, through the configuration of the multiple high spacers 130a, 130a' and the multiple middle spacers 130b, the reflective cavities 110 can be classified into multiple first reflective cavities 110a and multiple second reflective cavities 110b. In some of the high spacers 130a, the top edges 138a of the first inclined surfaces 134a may be flush with the top edges 138a' of the second inclined surfaces 136a, such that these inclined surfaces are used as the side surfaces 126 of some adjacent first reflective cavities 110a. In addition, in some middle spacers 130b, the top edges 138b of the first inclined surfaces 134b may also be flush with the top edges 138b' of the second inclined surfaces 136b, such that these inclined surfaces are used as the side surfaces 126 of adjacent second reflective cavities 110b.

Still referring to FIG. 2, some of the first reflective cavities 110a are adjacent to some of the second reflective cavities 110b, the side surface 126 of the first reflective cavity 110a and the side surface 126 of the second reflective cavity 110b adjacent thereto may be respectively formed by, for example, the first inclined surface 134a' and the second inclined surface 136a' of the high spacer 130a', and the top edge 138a of the first inclined surface 134a' of the high spacer 130a' is higher than the top edge 138' of the second inclined surface 136a' of the high spacer 130a'. In an embodiment not shown, side surfaces 126 of some of the first reflective cavities 110a and the side surfaces 126 of the second reflective cavities 110b adjacent thereto are respectively formed by the first inclined surfaces 134b and the second inclined surfaces 136b of some of the middle spacers 130b. The top edge 138b of the first inclined surface 134b of the middle spacer 130b may be, for example, flush with the top edge 138b' of the second inclined surface 136b of the middle spacer 130b.

Figure 3:
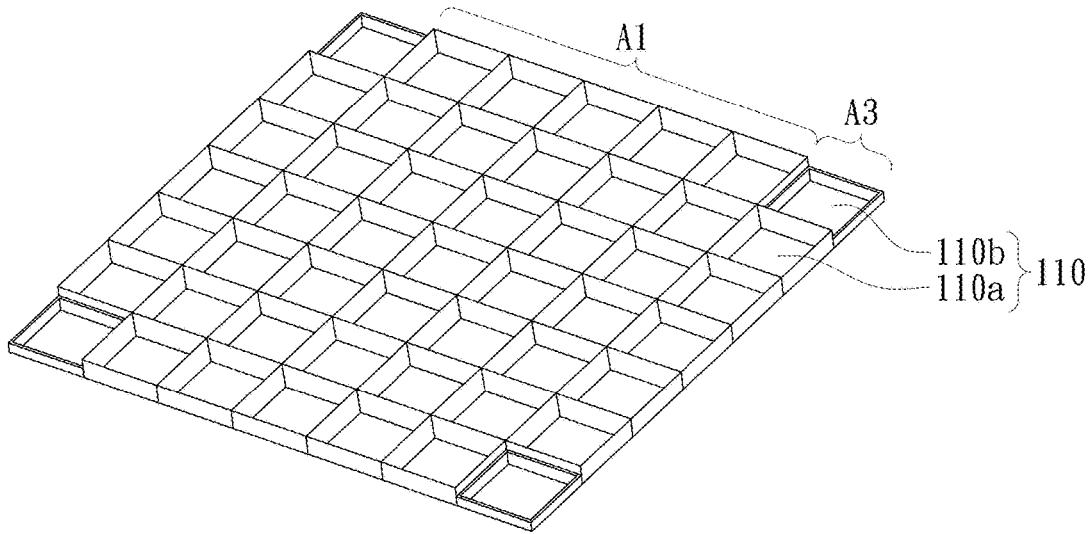
FIG. 3 is a schematic three-dimensional diagram of a reflective element according to a second embodiment of the present invention.

FIG. 3 is a schematic three-dimensional diagram of a reflective element according to a second embodiment of the present invention. As shown in FIG. 3, in the reflective element 100A according to the second embodiment, distribution regions of the reflective cavities 110 may be, for example, classified into a central region A1 and at least one peripheral region A3. In FIG. 3, for example, four peripheral regions A3 are provided and are respectively located at four corners of outermost peripheries of the central region A1, which is not limited thereto. In an embodiment, the multiple first reflective cavities 110a formed by the multiple high spacers 130a are, for example, distributed adjacent to each other in the central region A1, and the second reflective cavities 110b may be scattered in the four peripheral regions A3.

Figure 4:
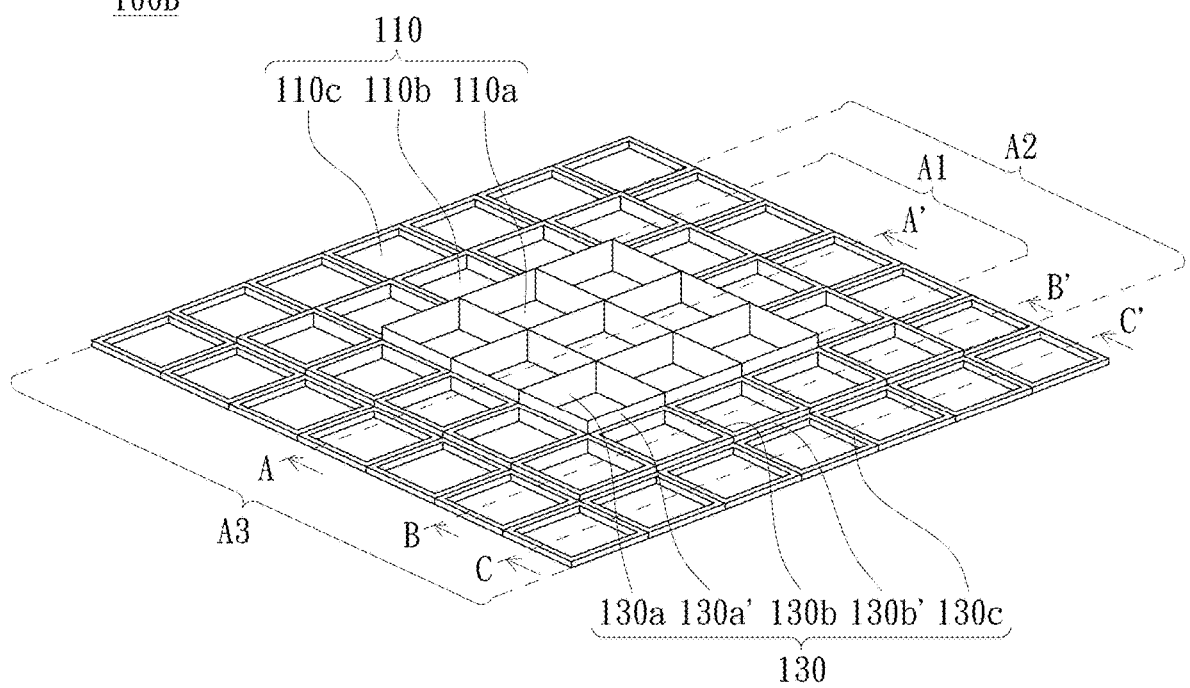
FIG. 4 is a schematic three-dimensional diagram of a reflective element according to a third embodiment of the present invention.
Figure 5:
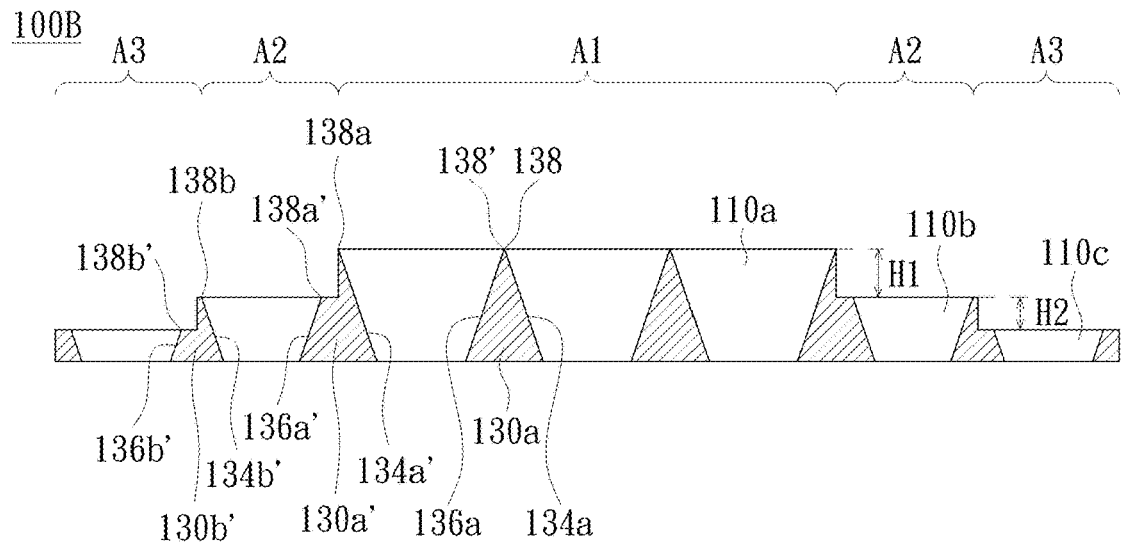
FIG. 5 is a schematic cross-section view of the reflective element along line A-A' according to the third embodiment of the present invention.
Figure 6:
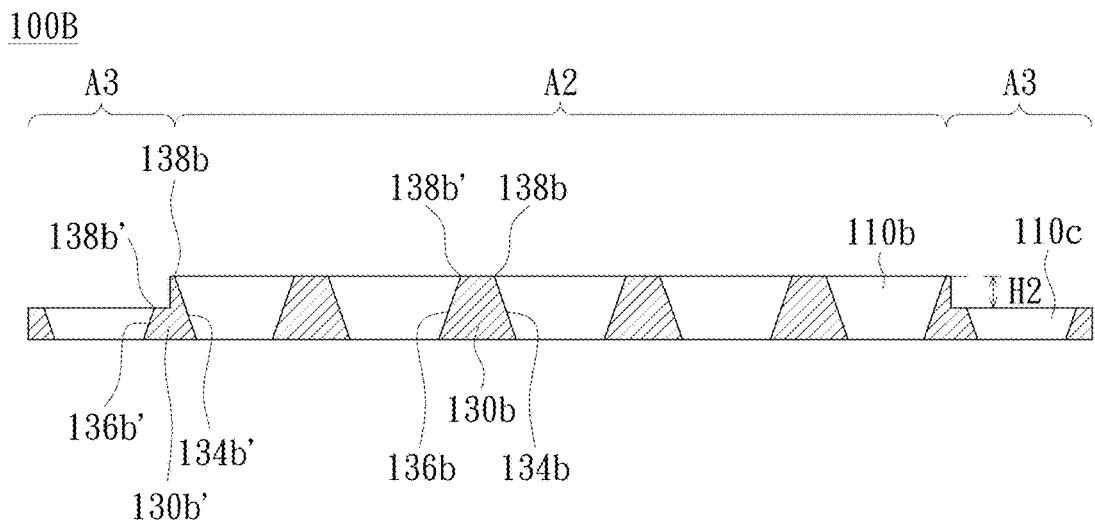
FIG. 6 is a schematic cross-section view of the reflective element along line B-B' according to the third embodiment of the present invention.
Figure 7:
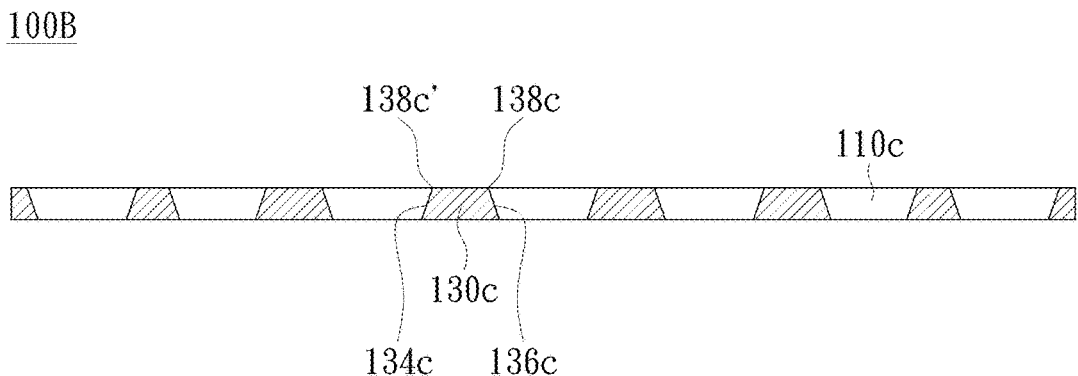
FIG. 7 is a schematic cross-section view of the reflective element along line C-C' according to the third embodiment of the present invention.

FIG. 4 is a schematic three-dimensional diagram of a reflective element according to a third embodiment of the present invention. FIG. 5 is a schematic cross-section view of the reflective element along line A-A' according to the third embodiment of the present invention. FIG. 6 is a schematic cross-section view of the reflective element along line B-B' according to the third embodiment of the present invention. FIG. 7 is a schematic cross-section view of the reflective element along line C-C' according to the third embodiment of the present invention. As shown in FIGS. 4 to 7, in the reflective element 100B according to the third embodiment, the spacers 130 may be, for example, classified into multiple high spacers 130a, 130a', multiple middle spacers 130b, 130b', and multiple lower spacers 130c. A first height difference H1 is present between the top edges 138a of the first inclined surfaces 134a, 134a' of the high spacers 130a, 130a' and the top edges 138b of the first inclined surfaces 134b, 134b' of the middle spacers 130b, 130b', and a second height difference H2 is present between the top edges 138b of the first inclined surfaces 134b, 134b' of the middle spacers 130b, 130b' and the top edge 138c of the first inclined surface 134c of the lower spacer 130c.

According to the foregoing description, in the reflective element according to the third embodiment, through the configuration of the multiple high spacers 130a, 130a', the multiple middle spacers 130b, 130b', and multiple lower spacers 130c, the multiple reflective cavities 110 may be, for example, classified into multiple first reflective cavities 110a, multiple second reflective cavities 110b, and multiple third reflective cavities 110c. As shown in FIGS. 4 and 5, in some of the high spacers 130a, the top edges 138a of the first inclined surfaces 134a may be flush with the top edges 138a' of the second inclined surfaces 136a, such that these inclined surfaces are used as the side surfaces 126 of some adjacent first reflective cavities 110a. As shown in FIGS. 4 and 6, in some middle spacers 130b, the top edges 138 of the first inclined surfaces 134b may also be flush with the top edges 138b' of the second inclined surfaces 136b, such that these inclined surfaces are used as the side surfaces 126 of adjacent second reflective cavities 110b. As shown in FIGS. 4 and 7, in some lower spacers 130c, the top edges 138c of the first inclined surfaces 134c may be flush with the top edges 138c' of the second inclined surfaces 136c, such that these inclined surfaces are used as the side surfaces 126 of some adjacent third reflective cavities 110c.

Further, as shown in FIGS. 4 and 5, some of the second reflective cavities 110b are adjacent to some of the third reflective cavities 110c, side surfaces 126 of the second reflective cavities 110b and the side surfaces 126 of the third reflective cavities 110c adjacent thereto are respectively formed by the first inclined surfaces 134b' and the second inclined surfaces 136b' of some of the middle spacers 130b', and the second height difference H2 is present between the top edge 138b of the first inclined surface 134b' of the middle spacer 130b' and the top edge 138b' of the second inclined surface 136b' of the middle spacer 130b'. In an embodiment, the top edge 138b of the first inclined surface 134b of the middle spacer 130b' is higher than the top edge 138b' of the second inclined surface 136b' of the middle spacer 130b'. In an embodiment not shown, side surfaces 126 of some of the second reflective cavities 110b and the side surfaces 126 of the third reflective cavities 110c adjacent thereto are respectively formed by the first inclined surfaces 134c and the second inclined surfaces 136c of some of the lower spacers 130c. The top edge 138c of the first inclined surface 134c of the lower spacer 130c may be, for example, flush with the top edge 138c' of the second inclined surface 136c of the lower spacer 130c.

Figure 8:
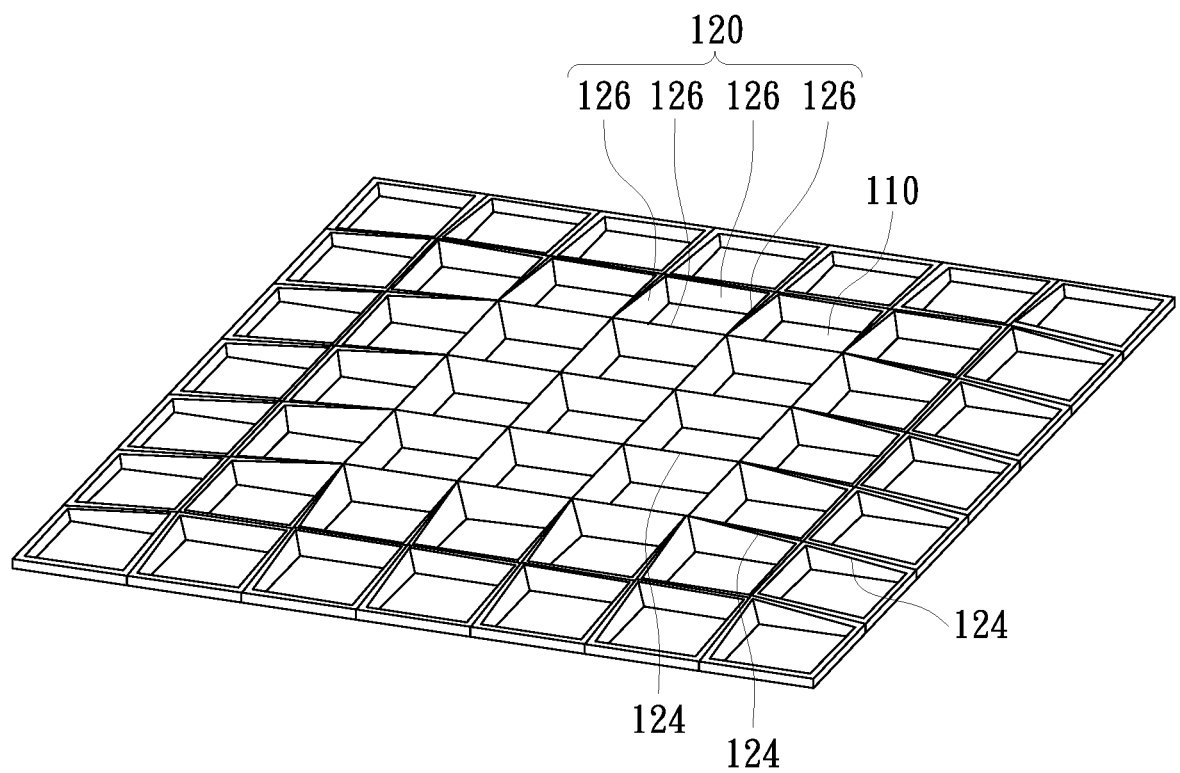
FIG. 8 is a schematic three-dimensional diagram of a reflective element according to a fourth embodiment of the present invention.
Figure 9:
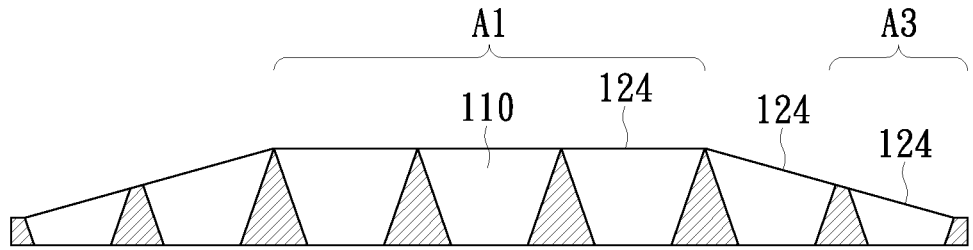
FIG. 9 is a schematic side view of the reflective element according to the fourth embodiment of the present invention.

FIG. 8 is a schematic three-dimensional diagram of a reflective element according to a fourth embodiment of the present invention. FIG. 9 is a schematic side view of the reflective element according to the fourth embodiment of the present invention. As shown in FIG. 8, in the reflective element 100c according to the fourth embodiment, the multiple reflective cavities 110 formed by multiple spacers 130 each have a peripheral surface 120, and the peripheral surface 120 has a peripheral-surface top edge 124. A spatial plane formed by the multiple peripheral-surface top edges 124 of the multiple reflective cavities 110 is not parallel to the substrate 11 (illustrated in FIG. 1), where the spatial plane formed by the peripheral-surface top edges 124 may be, for example, a curved surface or angular. For further description, as shown in FIG. 9, the highest region of the spatial plane formed by the multiple peripheral-surface top edges 124 may be, for example, located in the central region A1 of the reflective element 100C. The height of the peripheral-surface top edge 124 decreases from the central region A1 of the reflective element 100C to the peripheral region A3, and the peripheral region A3, for example, surrounds the central region A1. In addition, the peripheral-surface top edges 124 of some reflective cavities 110 in the central region A1 may be, for example, flush with each other.

Figure 10:
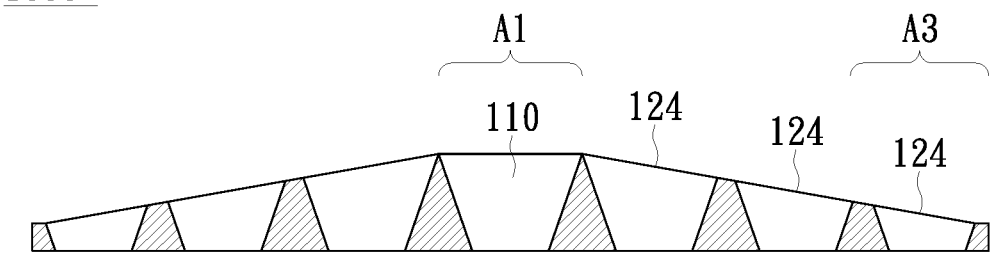
FIG. 10 is a schematic side view of the reflective element in another state according to the fourth embodiment of the present invention.

FIG. 10 is a schematic side view of the reflective element in another state according to the fourth embodiment of the present invention. As shown in FIG. 10, the height of the peripheral-surface top edge 124 of the reflective cavity 110 decreases from the central region A1 of the reflective element 100C' to the peripheral region A3. And, the peripheral-surface top edge 124 of the reflective cavity 110 in the direct center remains at the same height, the peripheral-surface top edges 124 of the other reflective cavities 110 are not at the same height. Alternatively, in an embodiment not shown, the peripheral-surface top edge 124 of any reflective cavity 110 is not at the same height.

Figure 11:
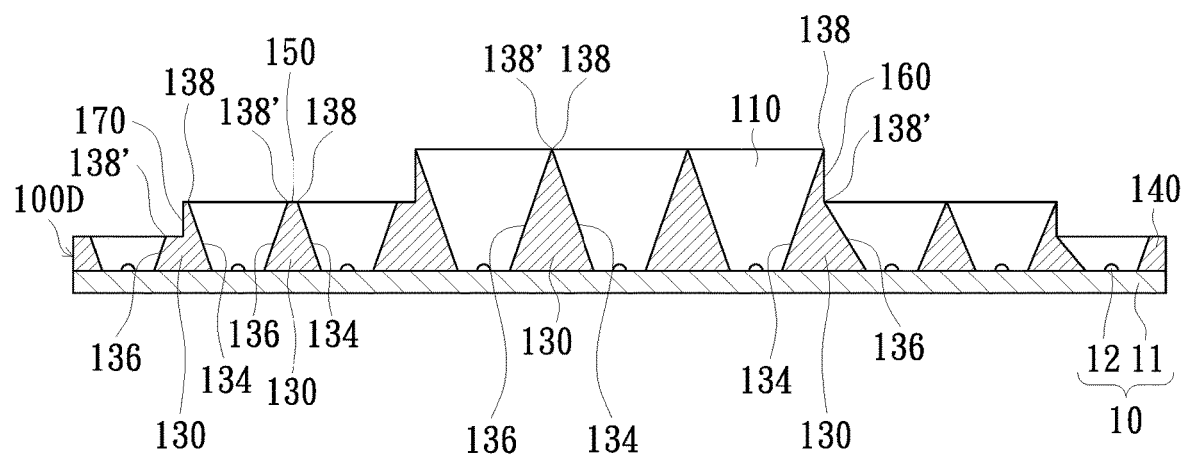
FIG. 11 is a schematic cross-section view of a reflective element disposed on a light board according to a fifth embodiment of the present invention.

FIG. 11 is a schematic cross-section view of a reflective element disposed on a light board according to a fifth embodiment of the present invention. As shown in FIG. 11, in the reflective element 100D according to the fifth embodiment, multiple spacers 130 are disposed on the substrate 11 to form multiple reflective cavities 110, and the outermost side of the reflective element 100D is provided with a frame 140 framing these reflective cavities 110 inside and disposed on the substrate 11. Based on the arrangement distance of the light emitting component 12 and the change of the inclined angle of the first inclined surface 134 and the second inclined surface 136 of the spacer 130, the spacer 130 has many variants.

In an embodiment, the bottom surface 132 of the spacer 130 is connected to the first inclined surface 134 and the second inclined surface 136. When the top edge 138 of the first inclined surface 134 is flush with the top edge 138' of the second inclined surface 136, the top edge 138 of the first inclined surface 134 is directly connected to the top edge 138' of the second inclined surface 136 or both are connected via a horizontal connection surface 150. When the spacer 130 has a height difference between the top edge 138 of the first inclined surface 134 and the top edge 138' of the second inclined surface 136, the top edge 138 of the first inclined surface 134 may be connected to the top edge 138' of the second inclined surface 136 via a vertical surface structure 160, a step-like structure 170, or another combination method.

According to the foregoing description, in the reflective elements 100, 100A, 100B, 100C, 100C', and 100D in the embodiments of the present invention, height differences are present between the top edges 138a of the first inclined surfaces 134a, 134a' of the high spacers 130a, 130a', the top edges 138b of the first inclined surfaces 134b, 134b' of the middle spacers 130b, 130b', and the top edge 138c of the first inclined surface 134c of the lower spacer 130c. Thus, the heights of the top edge 138a, the top edge 138b, and the top edge 138c change, for example, with an equal difference, an equal ratio, or in a random manner, such that the first height difference H1 is present between the top edge 138a and the top edge 138b, and a second height difference H2 is present between the top edge 138b and the top edge 138c. Description is made using the following examples, which is not limited thereto. When the heights of the top edge 138a, the top edge 138b, and the top edge 138c have an equal difference, the first height difference H1 is equal to the second height difference H2. When the heights of the top edge 138a, the top edge 138b, and the top edge 138c change in an equal ratio or a random manner, the first height difference H1 and the second height difference H2 are different, where the first height difference H1 may be, for example, greater than the second height difference H2 and the first height difference H1 is an integer multiple of the second height difference H2, or the first height difference H1 may be, for example, smaller than the second height difference H2 and the second height difference H2 is an integer multiple of the first height difference H1.

Figure 12:
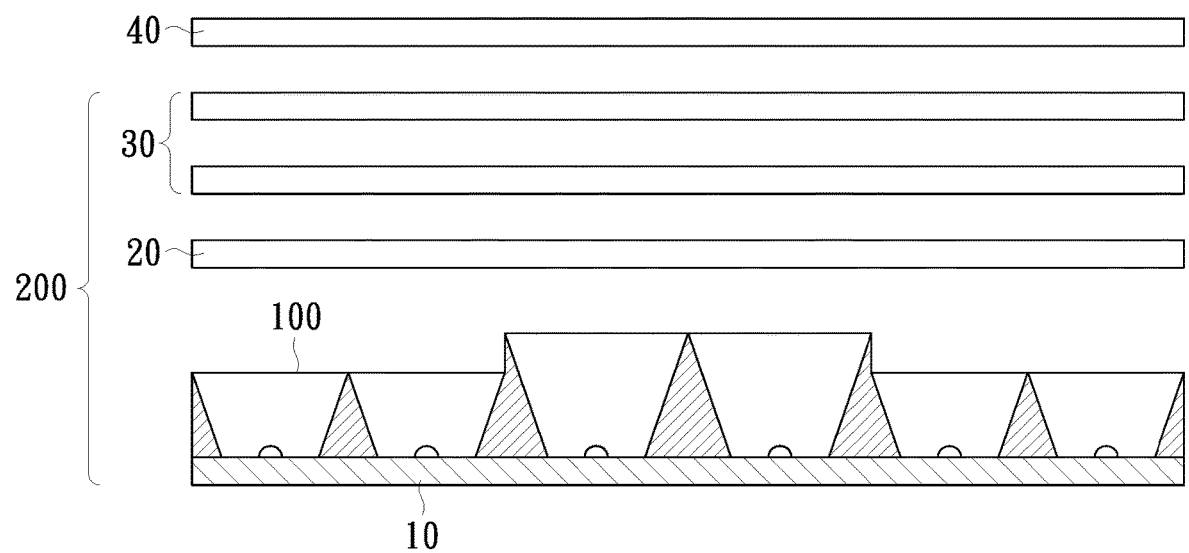
FIG. 12 is a schematic diagram of a backlight module and a display panel being configured according to an embodiment of the present invention.

FIG. 12 is a schematic diagram of a backlight module and a display panel being configured according to an embodiment of the present invention. As shown in FIG. 12, the backlight module 200 includes a light board 10, a reflective element 100, and an optical panel 20. Description is made by using the reflective element according to the first embodiment as an example, which is not limited thereto. The reflective element 100 is disposed on the light board 10, the optical panel 20 is disposed on the reflective element 100, and a spacing D is present between the optical panel 20 and the reflective element 100. In an embodiment, the top edge 138 of the first inclined surface 134 or the top edge 138' of the second inclined surface 136 of the spacer 130 closest to the optical panel 20 is at a distance of 1 millimeter to 4 millimeters from the optical panel 20. In an embodiment, the backlight module 200 further includes an optical film assembly 30. When the backlight module 14 is configured on a side of the display panel 40, the optical film assembly 30 is between the display panel 40 and the optical panel 20.

According to the foregoing description, the optical panel 20 is selected from a diffusion plate, a structural plate, or a combination thereof. In an embodiment not shown, the structural plate may, for example, include a plate body and multiple microstructures. The plate body has two opposite surfaces, and the microstructures are disposed on at least one of the two opposite surfaces of the plate body, and the microstructure may be constructed in a shape of a cross, a square pyramid, a triangular pyramid, or the like. Further, the optical film assembly includes one of a beam-splitting film, a brightness-enhancing film, or a combination thereof, or a light conversion film and a blue light-filtering film.

In the present invention, the multiple spacers are used to separate multiple reflective cavities, and the first inclined surface and the second inclined surface of the spacer respectively serve as the side surfaces of two adjacent reflective cavities. Some of the spacers have a height difference between the top edge of the first inclined surface and the top edge of the second inclined surface, and therefore the light emitting components (for example, the light emitting diode) correspondingly disposed in each reflective cavity reflect different light rays, so as to achieve consistent brightness in the central region, the transition region, and peripheral region of the reflective element, thus improving the uniformity of the light rays of the screen of the display panel.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A reflective element, comprising:
   a plurality of reflective cavities, wherein each of the reflective cavities comprises an upper opening, a lower opening, and a peripheral surface, wherein a peripheral-surface bottom edge of the peripheral surface is connected to the substrate, and the peripheral surface of each of the reflective cavities comprises a plurality of side surfaces; and
   a plurality of spacers, wherein each of the spacers comprises a bottom surface, a first inclined surface, and a second inclined surface, wherein the bottom surface is connected to the first inclined surface and the second inclined surface, the spacers are disposed on the substrate, the bottom surface of each of the spacers is flush with the peripheral-surface bottom edge, the first inclined surface and the second inclined surface respectively serve as the side surfaces of adjacent two of the reflective cavities;
   wherein distribution regions of the reflective cavities are at least classified into a central region and at least one peripheral region, wherein the peripheral surface of each of the reflective cavities has a peripheral-surface top edge, and the heights of the peripheral-surface top edges of the reflective cavities decrease from the central region to the at least one peripheral region;
   wherein the spacers are at least classified into a plurality of high spacers and a plurality of middle spacers, and the top edge of the first inclined surface of the high spacers is higher than the top edge of the second inclined surface of the high spacers by a first height difference.

2. The reflective element according to claim 1, wherein a spatial plane formed by the peripheral-surface top edges of the reflective cavities is not parallel to the substrate.

3. The reflective element according to claim 1, wherein the reflective cavities are at least classified into a plurality of first reflective cavities and a plurality of second reflective cavities,
   wherein some of the first reflective cavities are adjacent to each other, and the side surfaces of the two adjacent first reflective cavities are formed by the first inclined surface and the second inclined surface of high spacers, some of the second reflective cavities are adjacent to each other, and the side surfaces of the two adjacent second reflective cavities are formed by the first inclined surface and the second inclined surface of middle spacers.

4. The reflective element according to claim 1, wherein the spacers are classified into the plurality of high spacers, the plurality of middle spacers, and a plurality of lower spacers, and the top edge of the first inclined surface of each of the middle spacers is higher than the top edge of the first inclined surface of each of the lower spacers by a second height difference.

5. The reflective element according to claim 1, further comprising a frame disposed on the substrate and framing the reflective cavities.

6. The reflective element according to claim 3, wherein some of the first reflective cavities are adjacent to some of the second reflective cavities, and the side surfaces of the first reflective cavities and the side surfaces of the second reflective cavities adjacent thereto are respectively formed by the first inclined surfaces and the second inclined surfaces of the high spacers.

7. The reflective element according to claim 3, wherein some of the first reflective cavities are adjacent to some of the second reflective cavities, at least one of the side surfaces of some of the first reflective cavities and at least one of the side surfaces of some of the second reflective cavities adjacent thereto are respectively formed by the first inclined surface and the second inclined surface of the middle spacers, and the top edge of the first inclined surface of the middle spacers is flush with the top edge of the second inclined surface of the middle spacers.

8. The reflective element according to claim 6, wherein the first reflective cavities are distributed adjacent to each other in the central region, and the second reflective cavities are distributed in the at least one peripheral region.

9. The reflective element according to claim 8, wherein the at least one peripheral region is provided in plurality, and the plurality of peripheral regions are respectively distributed at at least four corners of outermost peripheries of the central region.

10. The reflective element according to claim 7, wherein the first reflective cavities are distributed adjacent to each other in the central region, and the second reflective cavities are distributed in the at least one peripheral region.

11. The reflective element according to claim 10, wherein the at least one peripheral region is provided in plurality, and the plurality of peripheral regions are respectively distributed at at least four corners of outermost peripheries of the central region.

12. The reflective element according to claim 4, wherein the reflective cavities are classified into a plurality of first reflective cavities, a plurality of second reflective cavities, and a plurality of third reflective cavities, wherein some of the second reflective cavities are adjacent to some of the third reflective cavities, the side surfaces of some of the second reflective cavities and the side surfaces of some of the third reflective cavities adjacent thereto are respectively formed by the first inclined surfaces and the second inclined surfaces of some of the middle spacers, and the top edge of the first inclined surface of the middle spacers is higher than the top edge of the second inclined surface of the middle spacers by the second height difference.

13. The reflective element according to claim 4, wherein the reflective cavities are classified into a plurality of first reflective cavities, a plurality of second reflective cavities, and a plurality of third reflective cavities, wherein some of the second reflective cavities are adjacent to some of the third reflective cavities, at least one of the side surfaces of some of the second reflective cavities and at least one of the side surfaces of some of the third reflective cavities adjacent thereto are respectively formed by the first inclined surface and the second inclined surface of some of the lower spacers, and the top edge of the first inclined surface of each of the lower spacers is flush with the top edge of the second inclined surface of each of the lower spacers.

14. The reflective element according to claim 4, wherein the first height difference is equal to the second height difference.

15. The reflective element according to claim 4, wherein the first height difference is different from the second height difference.

16. The reflective element according to claim 4, wherein the first height difference is greater than the second height difference, and the first height difference is an integer multiple of the second height difference.

17. The reflective element according to claim 12, wherein distribution regions of the reflective cavities are classified into the central region, at least one transition region, and the at least one peripheral region, and the at least one transition region is between the central region and the at least one peripheral region, wherein the first reflective cavities are distributed adjacent to each other in the central region, and the second reflective cavities are distributed adjacent to each other in the at least one transition region, and the third reflective cavities are distributed in the at least one peripheral region.

18. The reflective element according to claim 17, wherein the at least one peripheral region is provided in plurality, and the plurality of peripheral regions are respectively distributed at at least four corners of outermost peripheries of the central region.

19. The reflective element according to claim 13, wherein the first reflective cavities are distributed adjacent to each other in the central region, and the second reflective cavities are distributed adjacent to each other in the at least one transition region, and the third reflective cavities are distributed in the at least one peripheral region.

20. The reflective element according to claim 19, wherein the at least one peripheral region is provided in plurality, and the plurality of peripheral regions are respectively distributed at at least four corners of outermost peripheries of the central region.

21. The reflective element according to claim 15, wherein the first height difference is smaller than the second height difference, and the second height difference is an integer multiple of the first height difference.

22. A backlight module, comprising:
a light board, comprising a substrate and a plurality of light emitting components disposed on the substrate; and
a reflective element, comprising:
a plurality of reflective cavities, wherein each of the reflective cavities comprises an upper opening, a lower opening, and a peripheral surface, wherein a peripheral-surface bottom edge of the peripheral surface is connected to the substrate, the lower opening of each of the reflective cavities corresponds to each of the light emitting components, and the peripheral surface of each of the reflective cavities comprises a plurality of side surfaces; and
a plurality of spacers, wherein each of the spacers comprises a bottom surface, a first inclined surface, and a second inclined surface, wherein the bottom surface is connected to the first inclined surface and the second inclined surface, the spacers are disposed on the substrate, the bottom surface of each of the spacers is flush with the peripheral-surface bottom edge, the first inclined surface and the second inclined surface respectively serve as the side surfaces of adjacent two of the reflective cavities,
wherein distribution regions of the reflective cavities are at least classified into a central region and at least one peripheral region, wherein the peripheral surface of each of the reflective cavities has a peripheral-surface top edge, and the heights of the peripheral-surface top edges of the reflective cavities decrease from the central region to the at least one peripheral region;
wherein the spacers are at least classified into a plurality of high spacers and a plurality of middle spacers, and the top edge of the first inclined surface of the high spacers is higher than the top edge of the second inclined surface of the high spacers by a first height difference; and
an optical panel disposed on the reflective element, wherein the top edge of the first inclined surface or the top edge of the second inclined surface of the spacer closest to the optical panel is at a distance of 1 millimeter to 4 millimeters from the optical panel.

23. The backlight module according to claim 22, wherein the optical panel is selected from a diffusion plate, a structural plate, or a combination thereof.

24. The backlight module according to claim 22, further comprising an optical film assembly disposed on a side of the optical panel away from the reflective element.

25. The backlight module according to claim 23, wherein the structural plate comprises a plate body and a plurality of microstructures, wherein the plate body has two surfaces opposite to each other, and the microstructures are disposed on at least one of the two surfaces.

26. The backlight module according to claim 25, wherein the microstructure is in a shape of a cross, a square pyramid, or a triangular pyramid.

27. The backlight module according to claim 24, wherein the optical film assembly comprises one of a beam-splitting film, a brightness-enhancing film, or a combination thereof.

28. The backlight module according to claim 27, wherein the optical film assembly further comprises a light conversion film and a blue light-filtering film.

* * * * *